Aug. 7, 1928.  
G. BATTELLE ET AL  
1,680,198  
DERRICK STRUCTURE FOR OIL, GAS, AND ARTESIAN WELLS  
Original Filed Oct. 15, 1921   10 Sheets-Sheet 1

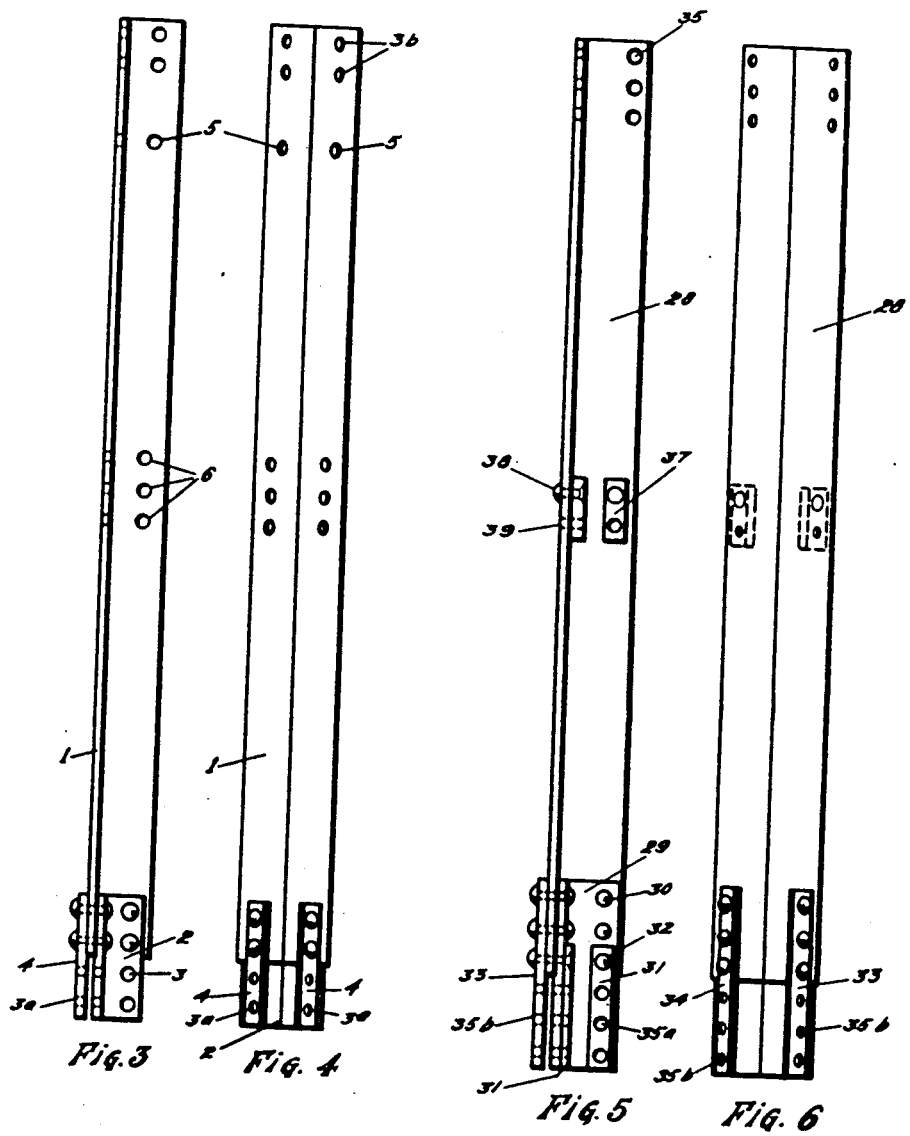

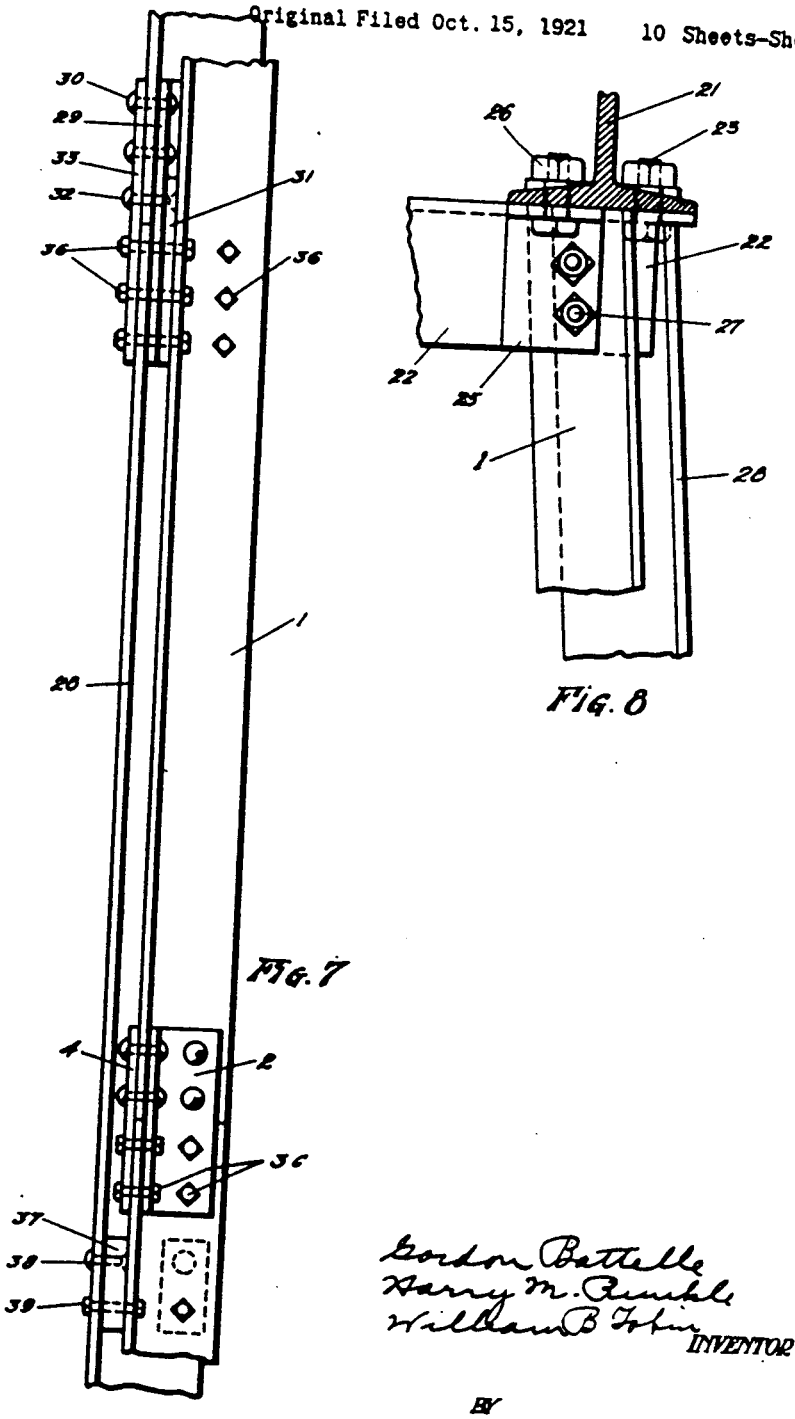

Aug. 7, 1928.
G. BATTELLE ET AL
1,680,198
DERRICK STRUCTURE FOR OIL, GAS, AND ARTESIAN WELLS
Original Filed Oct. 15, 1921    10 Sheets-Sheet 4
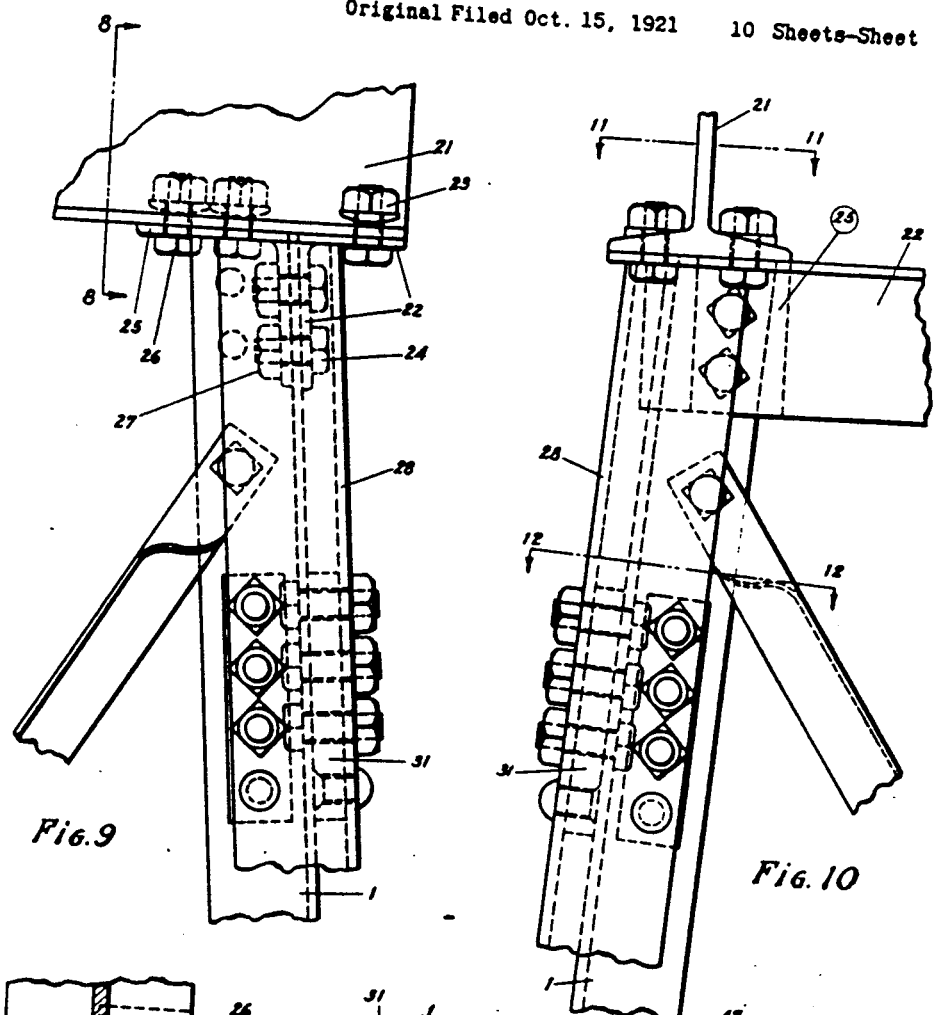
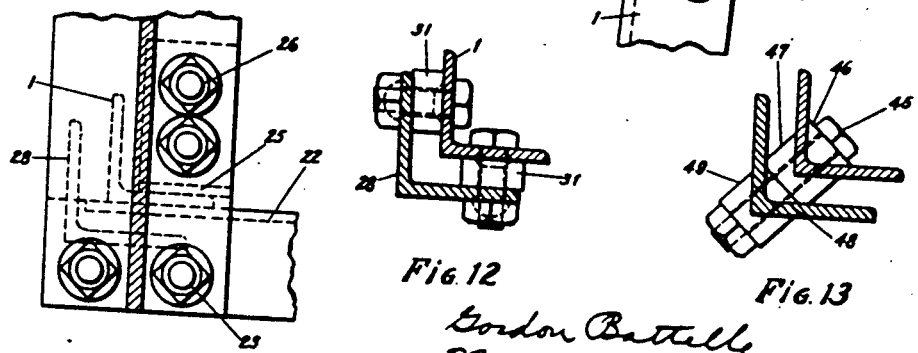

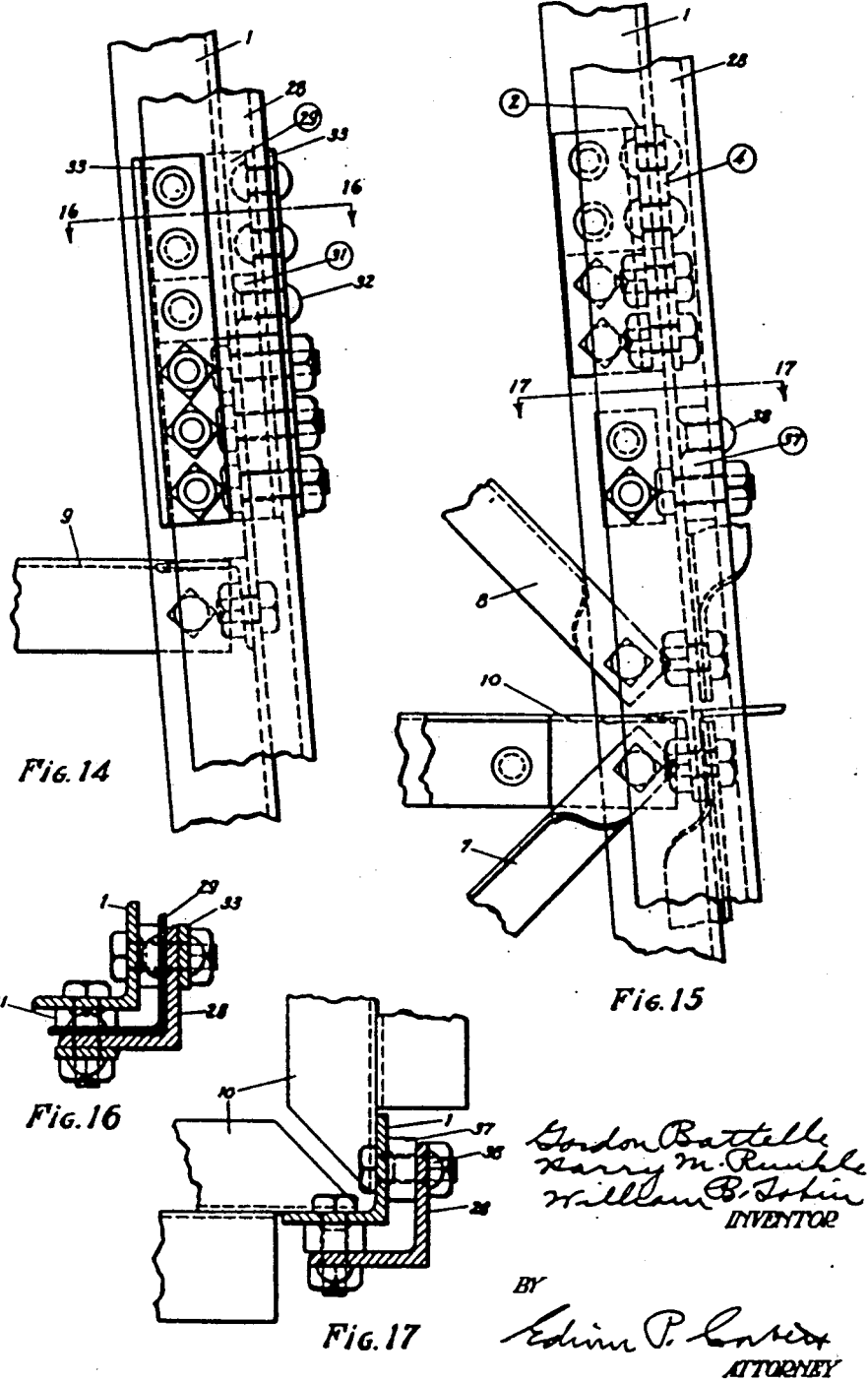

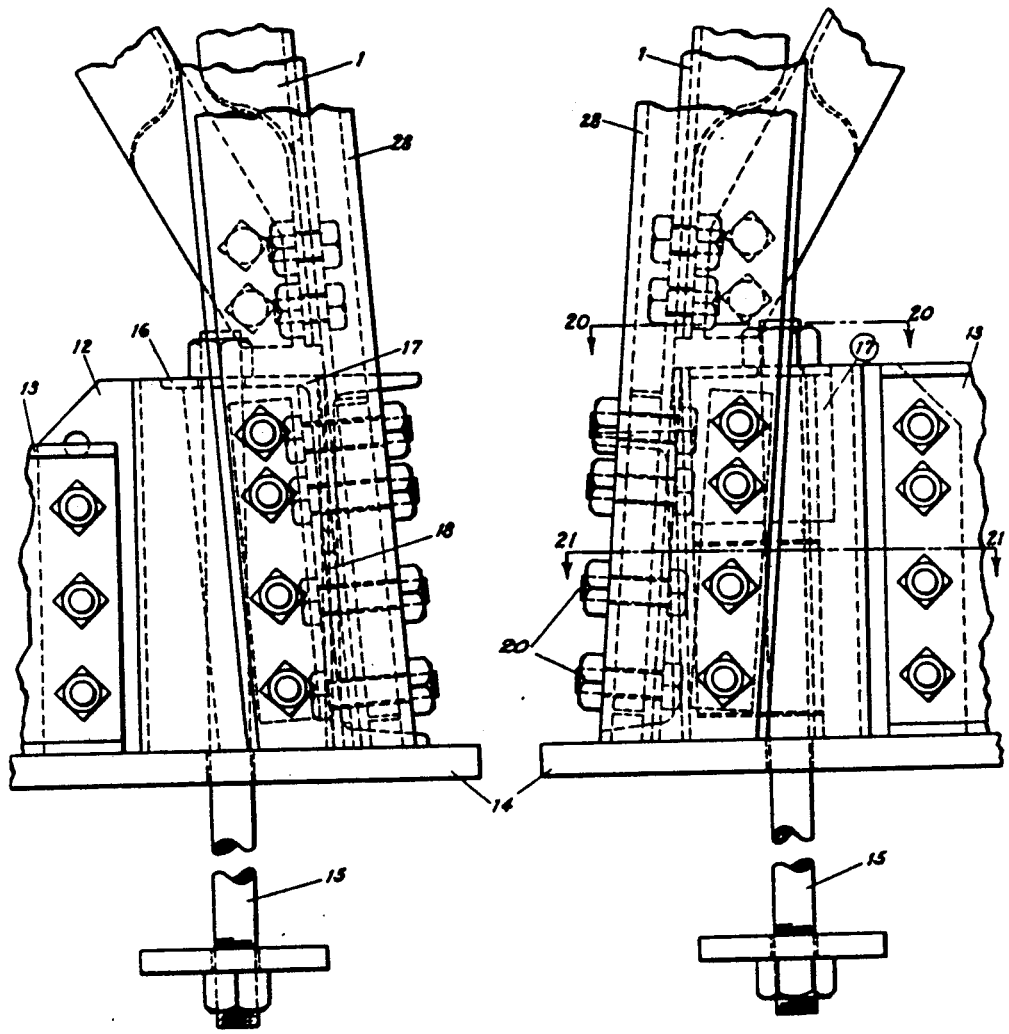

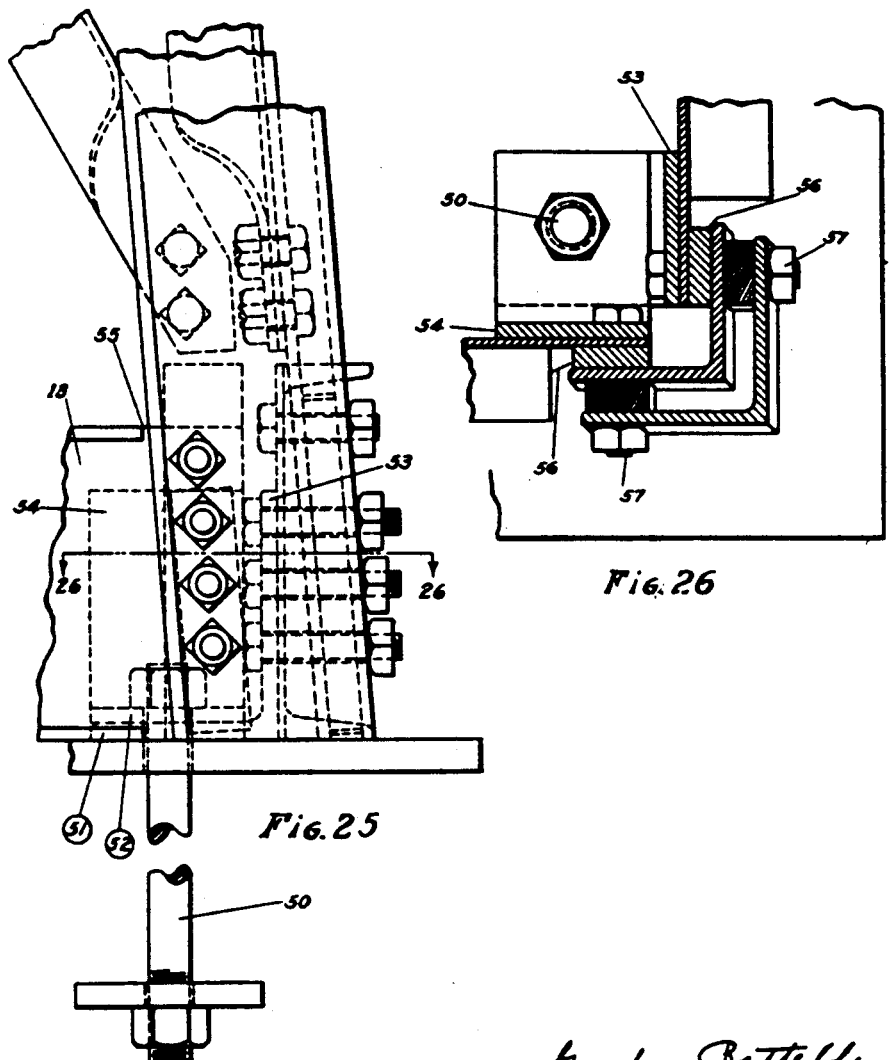

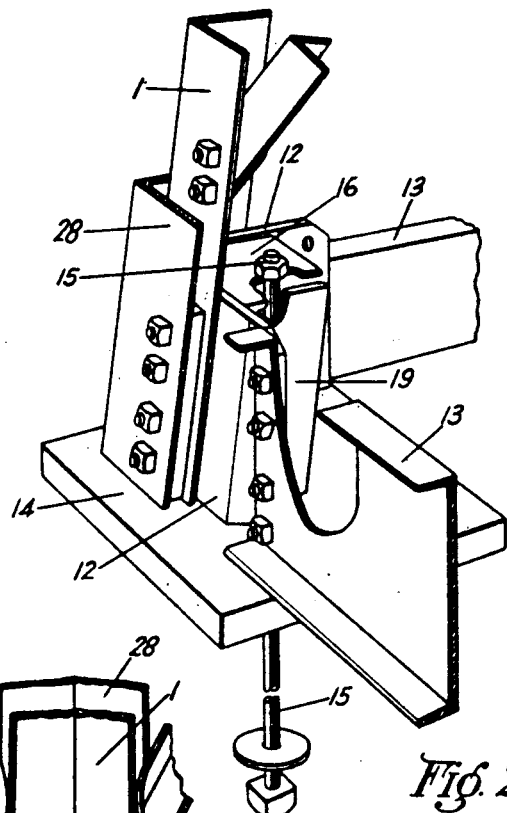
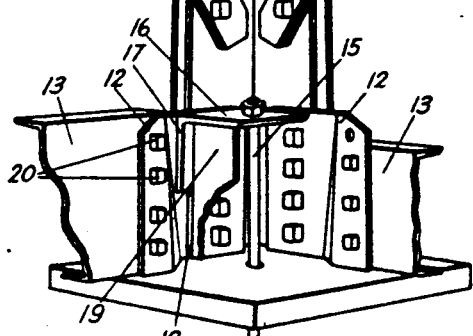
Fig. 27
Fig. 28

Patented Aug. 7, 1928.

1,680,198

UNITED STATES PATENT OFFICE.

GORDON BATTELLE AND HARRY M. RUNKLE, OF COLUMBUS, OHIO, AND WILLIAM B. TOBIN, OF LOS ANGELES, CALIFORNIA, ASSIGNORS TO THE INTERNATIONAL DERRICK & EQUIPMENT COMPANY, OF COLUMBUS, OHIO, A CORPORATION OF OHIO.

DERRICK STRUCTURE FOR OIL, GAS, AND ARTESIAN WELLS.

Original application filed October 15, 1921, Serial No. 507,822. Divided and this application filed November 3, 1922. Serial No. 598,906.

Our invention relates to derrick structure for oil, gas and artesian wells and has to do with the provision of a novel type of derrick structure that has many advantages both in the cost of erection and maintenance. It also results in important efficiencies and economies for the oil operator so that the cost of derrick installation for any given set of derricks will be very greatly decreased and the derrick service greatly increased. This application is a division of our application Serial No. 507,822, filed October 15, 1921, for derrick structure for oil, gas and artesian wells.
In the past, in the use of derricks for the purpose indicated above, it has been the practice to initially build a derrick of comparatively heavy structure necessary for drilling. This, in itself, has presented certain difficulties due to the comparatively heavy parts and the handling of the same. In most instances, these derricks have been allowed to remain in position after the drilling operation and used during the pumping operation until destroyed by the elements or until their use becomes impracticable because of weakness or threatened destruction, when they are replaced by a lighter derrick. On the other hand, it has been frequently found that the heavier derrick presents too great a wind hazard, so that as soon as drilling is completed, it is practically necessary to tear down the drilling derrick and to replace it with a lighter derrick for pumping and of a structure to minimize this wind hazard.

Furthermore, the use of a derrick of drilling or heavy construction represents an unnecessarily large investment in its continued long use during the pumping stage of the well, and it has been the practice, after completing the drilling work, to remove the heavy drilling derrick and to replace it by a less costly lighter derrick for the latter work.

One of the objects of our invention is the provision of a main unit and an auxiliary unit, which are both specially constructed with relation to each other in order that the auxiliary unit may effectively reenforce the main unit for heavy duty and yet may be removed from this main unit without detracting from the value and effectiveness of the main unit for lighter work. In this respect, the structure is applicable to both drilling and pumping wells, the reenforcing means being in place and effective during drilling and removed during pumping operations, with the result that the reenforcing unit may be applied to other similar derricks during the drilling stage.

Another object of our invention consists in the provision of a derrick structure whereiin the loads on the various members are distributed directly from one member to another and not through any bolts, rivets or other connecting means between the members. For example, the water table in our structure rests directly on top of the four leg members and the various sections of the leg members are in end-to-end abutting relation and are held in such relation by socket formations. The result is that there is a direct application of the loads from the crown block to the derrick foundation, through the sectional supporting members and independently of any shear stress resulting from the use of bolts, rivets or other like connections.

Another feature of our invention has to do with the provision of leg sections that are joined together shortly above the girts and that are specially constructed for the reception of specially constructed reenforcing members. The reenforcing members are such that they may be applied one section at a time and by a simple operation.

Still another feature of our invention has to do with the provision of means for connecting the main reenforcing supports, such means being so constructed in such a novel improved manner as to give the derrick the maximum possible base area and the maximum possible resistance to the twisting of the tower from an unbalanced load or an excessive wind pressure.

Various other features of our invention will be apparent as this description progresses and will be brought out in the claims appended thereto. The various objects of our invention are preferably obtained by the structure illustrated in the drawings wherein similar characters of reference designate corresponding parts and wherein:

Figure 2 is a side elevation of the top part of this structure, showing the method of applying the load from the crown block to the interior and exterior supporting members.

Figure 3 is a detail view of a fabricated inner leg section showing the socket connection used for connecting each leg section.

Figure 4 is a rear elevation of the structure shown in Figure 3.

Figure 5 is a detail view of a fabricated outer leg section showing the preferred socket connection and the filler blocks riveted to the leg section.

Figure 6 is a rear elevation of the structure shown in Figure 5.

Figure 7 is a detail view of a connected inner and outer leg section showing the manner of connecting the two leg sections and the staggered relation of their respective joint connections.

Figure 8 is a detail view taken on line 8—8 of Figure 9 and illustrating a front and interior view of the structure shown in Figures 9 and 10.

Figure 1:
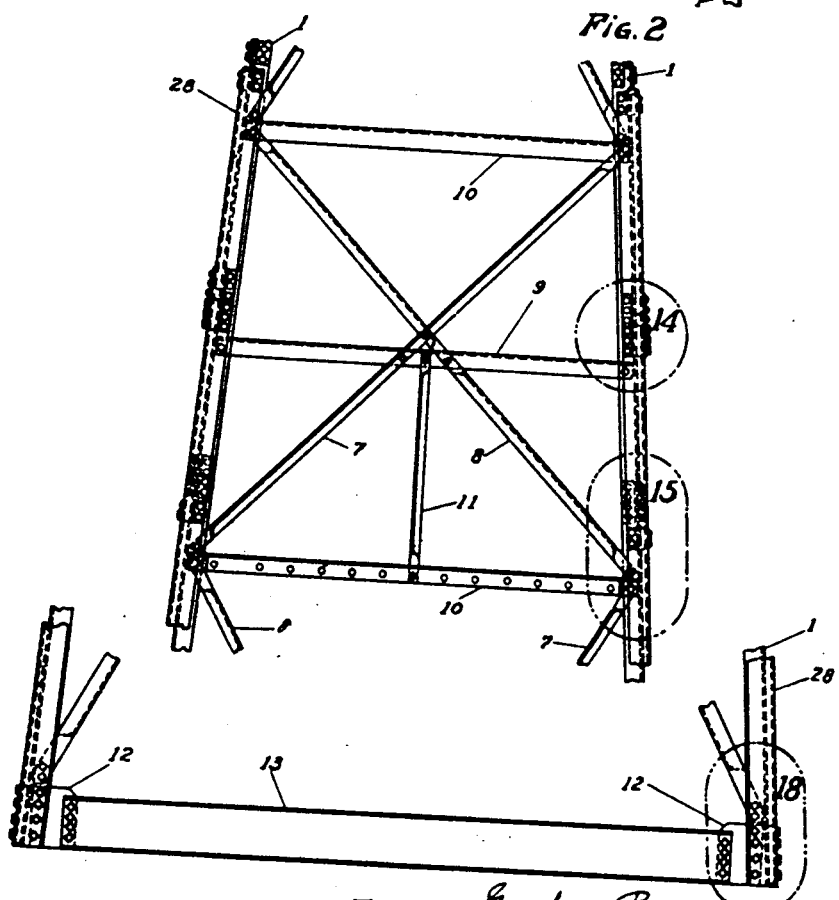
Figure 1 is a front elevation of our combination derrick structure.

Figure 9 is an enlarged detail view at connection 9 of Figure 1, showing the connection between the water table and the interior and exterior supporting angles and the means for securing the exterior reenforcing leg to the interior leg at this point.

Figure 2:
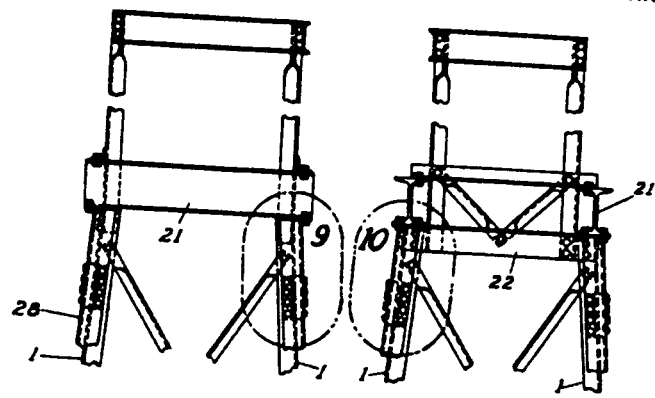

Figure 10 is an enlarged detail view taken at the connection 10 of Figure 2 and illustrating a side view of the structure shown in Figure 9.

Figure 11 is a cross-section taken on line 11—11 of Figure 10.

Figure 12 is a horizontal cross-section taken on line 12—12 of Figure 10 and showing the interior and exterior leg members and the filler blocks riveted to the exterior leg members.

Figure 13 is a detail view similar to Figure 12 but showing a modified form of our means for securing the interior reenforcing angle and the interior supporting angle.

Figure 14 is an enlarged detail view taken at connection 14 of Figure 1 and showing a means for connecting the exterior reenforcing joint to the interior supporting angle.

Figure 15 is an enlarged detail view taken at connection 15 of Figure 1 and showing the method of joining and connecting to interior supporting leg sections.

Figure 16 is a transverse section taken on line 16—16 of Figure 14 showing the interior and exterior strap bars and illustrating the method of connecting two adjacent ends of the reenforcing angles and the interior supporting angle.

Figure 17 is a cross-section taken on line 17—17 of Figure 15 showing the girt and interior leg connections and the manner of reenforcing both.

Figure 18 is an enlarged detail view taken at base connection 18 of Figure 1, and showing the manner of connecting the supporting legs to form the strong base construction.

Figure 19 is a detail side view of the structure shown in Figure 18.

Figure 20:
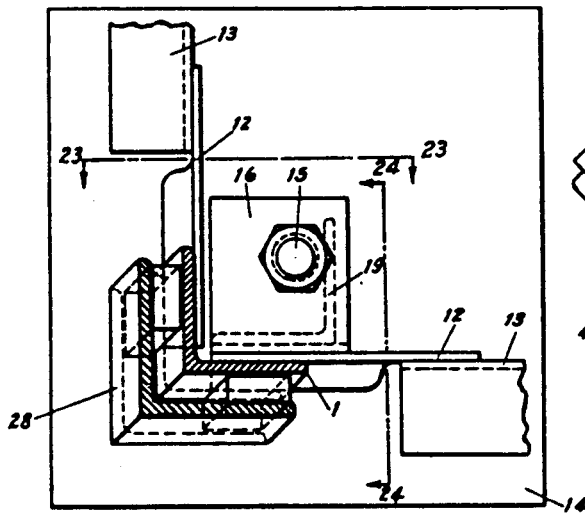

Figure 20 is a detail cross-section taken on line 20—20 of Figure 19 and showing the anchor bolt connections and the manner of connecting the channels to the supporting and reenforcing legs.

Figure 21:
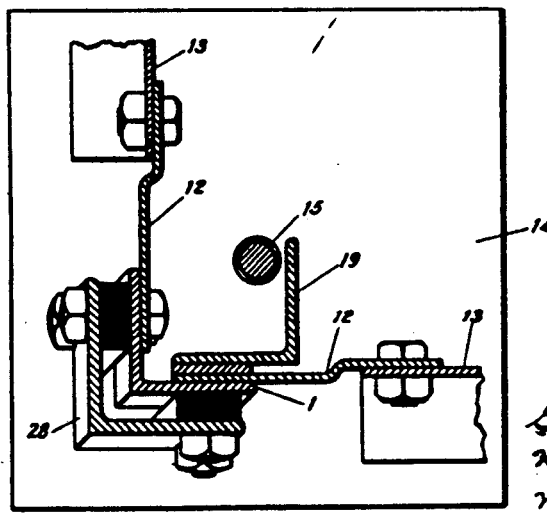

Figure 21 is a detail cross-section on line 21—21 of Figure 19.

Figure 22:
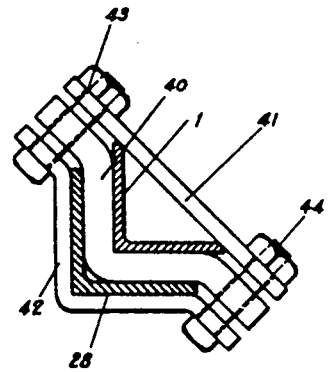

Figure 22 is a detail cross-section similar to Figure 13 and showing a second modified form of our means for connecting the inner and outer leg members.

Figures 23, 24:
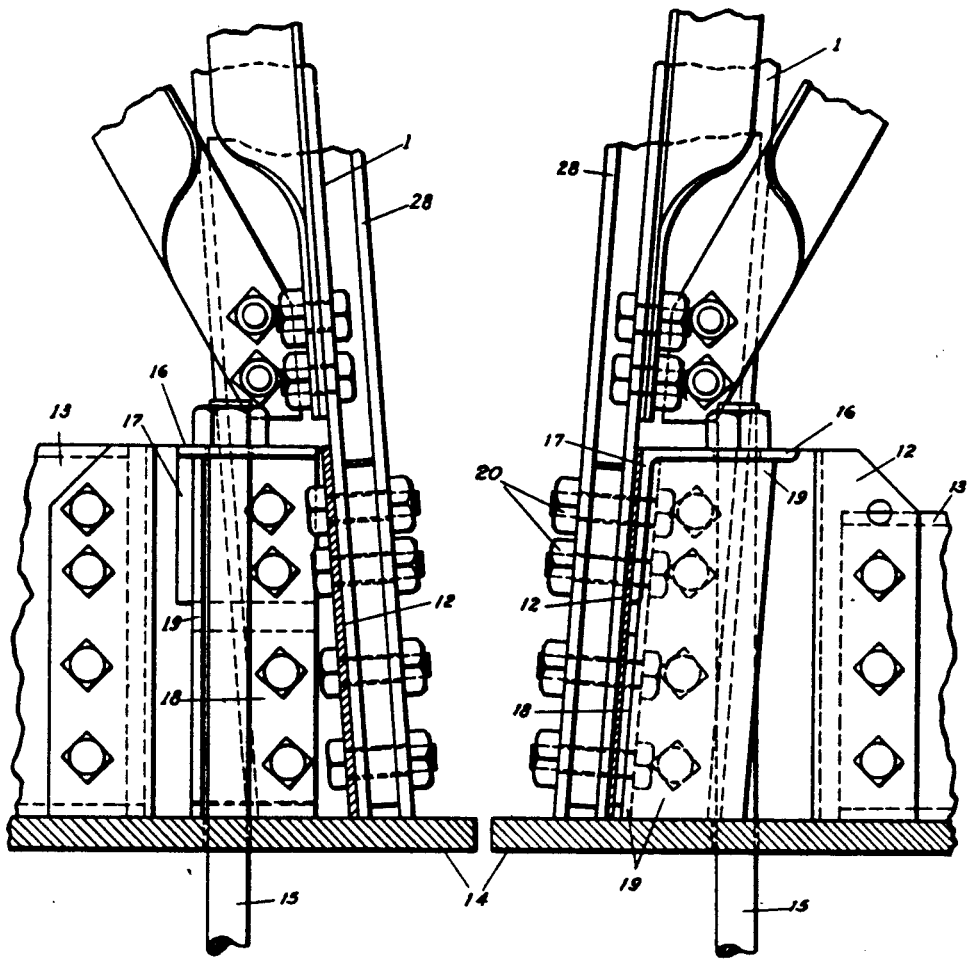

Figure 23 is a detail view taken on line 23—23 of Figure 20 and illustrating an interior elevation of the structure shown in Figures 18 and 19.

Figure 24 is a detail view of the structure shown in Figure 23 taken on line 24—24 of Figure 20.

Figure 25 is a detail view similar to Figure 18 but showing a modified form of our base and anchor connections.

Figure 26 is a cross-section taken on line 26—26 of Figure 25.

Figure 27 is a perspective view of the base structure showing the exterior construction thereof.

Figure 28 is a perspective view of the base structure showing the interior construction thereof.

In the drawings, our combination derrick construction is shown as comprising a light but sufficiently strong inner unit together with an outer unit structure. These inner and outer units are so built that they will serve as complements to each other for the purpose of doing heavy work as in drilling wells while the inner unit may be used effectively for lighter work such as pumping, the outer unit structure being removable and applicable to the other inner unit structures.

Referring particularly to Figures 3 and 4, it will be understood that the inner unit structure is made up of leg member sections 1 which are preferably of structural steel and so fabricated as to facilitate sectional field erection. More specifically, these leg member sections are shown as made up of commercial angle iron and the lower or base sections will desirably be of a heavier weight than the upper leg sections, their weights and shapes being so designed as to give maximum strength and minimum weight for a derrick to be used for pumping or other light operations.

The leg sections are provided upon the inner surfaces of their lower ends with angle irons 2 that are riveted to the leg sections and that extend below the same, being provided in such extensions with bolt holes 3. Splice straps 4 are also riveted to the lower ends of the leg member sections upon the outer sides of the sections and these splice straps extend below the sections in parallelism with the faces of the angle irons 2. These extensions are provided with bolt holes $3^a$. It will be apparent that the angle iron 2 and the straps 4 form a socket for the reception of the upper end of the leg member section immediately beneath and, for this reason, the upper end of each section is provided with a plurality of bolt holes $3^b$ which are so arranged as to permit of firm abutment of these leg member sections end-to-end. Bolts placed in the holes 3, $3^a$, and $3^b$ will secure these leg member sections together and ensure the maintenance of these sections in their end-to-end abutting relation.

The position that these leg member sections take, when in this end-to-end abutting relation, is shown in Figure 7 where these leg member sections of the inner unit structure are disclosed in conjunction with the leg member sections of the outer unit structure which will be subsequently described. In this Figure 7, it will be seen that the leg member sections 1 are held together by the bolts $3^c$ passing through the registering holes 3, $3^a$ and $3^b$. Referring again to Figures 3 and 4, it will be noted that the inner leg member sections are provided with two additional sets of holes that may be respectively designated 5 and 6. These holes 5 and 6 are provided for the reception of bolts that serve to hold the outer leg member sections in position, as will be subsequently described.

In the main body of the inner unit of our derrick structure, the leg member sections are braced by means of a special bracing unit which is shown best in Figure 1. This bracing unit comprises cross arms 7 and 8, a lower girt 9 and an upper girt 10. The lower ends of the cross arms 7 and 8 are connected to the leg members just below the connections between the leg member sections. These cross arms are also connected immediately below their intersecting points to the girt 9 and they also connect to each other at their points of intersection. Furthermore, they are connected at their upper ends to both the leg member sections and to the girt 10, the construction being preferably such that the same bolts that connect the upper ends of the cross arms 7 and 8 to the leg member sections also connect the girt 10 to such leg member sections. Some of these bracing units may comprise a substantially vertical brace 11.

As shown in Figure 21, the lower ends of each bottom leg member section is provided on opposite sides thereof with gusset plates 12. The two gusset plates 12 on each side of the derrick structure are connected by a channel 13 with the result that the lower ends of the bottom leg member sections are firmly connected and braced.

Referring to Figures 18 to 24, inclusive, and more especially to Figure 24, it will be noted that the lower ends of the lower leg sections 1 of the inner unit structure bear directly upon base plates 14. These base plates constitute the base members of anchor structures which are designed to receive and support the derrick legs and by which these legs are securely connected to the surface upon which the derrick structure is mounted. Before proceeding with a description of these anchor structures, it is important to note that the direct contact of the lower leg sections 1 with the base plates 14 ensures that any weight placed upon the upper leg sections and transmitted therethrough by means of their end-to-end abutting relation will likewise be directly transmitted to the base plates entirely independently of any bolt or rivet structure and the consequent limitations that would thereby arise due to shearing stresses upon the bolts.

The base plates 14 are connected to the leg members 1 through the medium of bolts 15 which pass through horizontal plate portions 16 of angle members 17. These angle members 17 are in alignment with filler blocks 18 and these members 17 and 18 are clamped to the gusset plates 12 and to the legs 1 through the medium of inclined angle members 19 and bolts 20. The horizontal portions 16 of the angle members 17 rest upon the inclined upper edges of the angle members 19 (shown best in Figure 24). It will be noted that the horizontal plate portion 16 of the angle members 17 is firmly supported and braced by the angle 19 upon which it rests.

At the upper end of the derrick structure, the upper leg member sections 1 directly contact with and support I-beams 21 as shown best in Figures 8, 9 and 10. In addition, there are provided side angles 22 which extend between opposite legs of the inner unit structure and which are bolted as at 23 to the I-beams 21 and as at 24 to the inner leg member sections 1. There are also provided short angle members 25 which are bolted as at 26 to the I-beams 21 and which are also bolted as at 27 to the inner side of the leg member sections 1. These angles 22 and 25 merely serve to ensure a rigid connection between the various parts of the top structure. The entire weight of the crown block and water table I-beams will be transmitted directly to the leg member sections 1 and through these leg member sections 1 to the base plates 14 by means of the direct bearing relations of the leg member sections to the I-beams, to each other and to these base plates 14. This direct bearing relation entirely eliminates any shearing stress upon rivets or bolts and distributes the load equally to the legs and to the bases.

The outer unit structure primarily comprises specially fabricated pieces of the type illustrated best in Figures 5 and 6. These sections may be designated 28 and they are provided at their lower ends and upon the inner surfaces thereof with angles 29 that are riveted thereto as at 30 and that extends below the main body portions of these members 28. These angles 29 are further provided upon their inner surfaces with filler blocks 31 which are riveted to the main body portions of the sections 28 as at 32. Disposed upon the outer surfaces of the main body portions of the leg sections 28 and at the upper end thereof are straps 33 and 34 which are secured thereto by the rivets 30. These straps 33 and 34 likewise extend down below the main body portions of the sections 28 and into parallel spaced relation to the angle members 29, thereby forming sockets for the reception of the upper ends of the leg sections immediately below. The upper ends are of the form shown in Figures 5 and 6 and are provided with bolt holes 35 designed to register with bolt holes 35ᵃ passing through the filler blocks and angle plates 29 and are also designed to register with the bolt holes 35ᵇ in the plates 33 and 34. The bolts which pass through these registering bolt holes 35, 35ᵃ and 35ᵇ are shown at 36 in Figure 7 where it will be seen that these bolt holes also pass through the bolt holes 6 of the leg members 1 (see Figures 3 and 4).

By inspection of Figure 7, it will be apparent that the filler blocks 31 bear firmly against the outer surfaces of the leg member sections 1 and effect a rigid bracing action. By inspection of this Figure 7 and also of Figures 5 and 6, it will be noted that the leg member sections 28 of the outer unit of our derrick structure are provided at intermediate points with filler blocks 37 which are secured to the inner surfaces of such leg member sections by rivets 38 and which are likewise provided with bolt holes 39 that are designed to register with bolt holes 5 in the inner leg member sections 1. It is important to note that the outer leg member sections are disposed in staggered relation to the inner leg member sections 1. Thus, it will be seen that the joint between the outer leg member sections in Figure 7 is approximately intermediate the length of the inner leg member section 1. On the other hand, the filler blocks 37 of the outer leg member sections lie against the inner leg member sections. This greatly enhances the strength and rigidity of the structure.

A modified filler block construction is shown in Figure 22 wherein it will be seen that a filler block 40 is disposed between the inner leg member sections 1 and the outer leg member sections 28. This filler block is maintained in position by means of a clamping structure embodying a flat plate 41 and an angle plate 42 together with bolts 43 and 44 which pass through apertures in the ends of the plates 41 and 42 and the filler blocks 40 without passing through the inner or outer leg member sections. This filler block construction is preferably placed upon the leg member sections at a point immediately above the sockets which join such leg member sections so that there will be no danger of the clamping structure slipping down out of its proper position.

A modified form of clamping and filler block construction is shown in Figure 13. This structure is such as to permit of the use of a single bolt and of a single filler block to effect rigid clamping of the inner and outer leg member sections together. In this form, a single bolt 45 is utilized and upon it is mounted a conical washer member 46 which is designed to fit the inner angle of the leg member 1. In conjunction with this member 46, we utilize a filler block 47 which is designed to fit the exterior angle of the leg member 1 and which contacts with the base of a conical washer member 48 that is designed to fit the interior angle of the outer leg members 28. There is further provided a washer element 49 which fits the exterior angle of the leg member section 28. The manner in which these elements cooperate will be apparent from an inspection of Figure 13. The elements 46 and 48 are interchangeable and the elements 47 and 49 are likewise interchangeable.

A modified form of base structure is shown in Figures 25 and 26 and, in this form, the anchor bolt 50 which extends downwardly from the base plate passes above such base plate through horizontal base portions 51 and 52 of superimposed angles whose vertical legs are respectively shown at 53 and 54. In this form, the channel members 13 are cut away as at 55 and extend directly in overlapping relation to the leg member sections. These extensions are spaced from the leg member sections by filler blocks 56 and are connected by means of the bolts 57 passing through the vertical legs 53 and 54 of the angles, the extensions of the channels, the filler blocks 56, the inner and outer leg members and the filler blocks interposed between such inner and outer leg members.

It will be seen that we have provided a novel and simple type of derrick construction which is amply rigid and well adapted to heavy duty but which may be partially dismantled so that a portion of it may be utilized in performing light duty while the heavy parts may be used in connection with other derrick structures. It will be further noted that the sections of our outer unit are mounted in staggered relation to the sections of our inner unit which not only facilitates erection but greatly enhances the rigidity and strength of the entire derrick structure.

It will further be noted that both our inner and outer units are so constructed and so cooperate that the weights placed upon the inner and outer member sections will be transmitted from the top of the derrick to the base without dependence upon any bolts which would be subjected to shearing stresses.

It will further be obvious that our derrick structure combines sections which have an interfitting relation, sections which are provided with spacer or filler blocks preferably carried by the sections themselves together with juncture points that are a short distance above the girts so that erection is facilitated. There are numerous features involved in the combination of elements which go to make up our derrick structure.

Having thus described our invention, what we claim is:

1. Derrick structure comprising leg members formed in sections, three spaced girts, braces intersecting adjacent the middle girt, said braces terminating at their upper ends at the upper of said girts and at their lower ends immediately above the lower of said girts and a strap extending vertically from the lower girt to the middle girt and dividing the angle produced by said braces below their points of intersection.

2. Derrick structure for oil, gas and artesian wells comprising inclined legs and braces combined to form a tower, base sills with their webs substantially vertical, means connecting said base sills to said legs so that the base sills are removable without dismantling the derrick structure, said means embodying an intermediate element compensating for the varying planes of the leg members and the webs of the base sills.

3. Derrick structure for oil, gas and artesian wells comprising leg members, anchoring means connected to the lower end of each of said leg members, braces secured to said leg members, crown block supporting structure resting upon the top of said leg members, and a base supporting structure comprising base plates, bolts extending upwardly through said base plates and adapted to engage said anchoring means to anchor said leg members to said base plates, said base plates being loose relative to said bolts.

4. Derrick structure for oil, gas and artesian wells comprising leg members formed in sections, means for connecting said sections, base members connected to said leg members, crown block supporting means carried by said leg members, base plates carrying said leg members, bolts extending upwardly through said base plates, and means for connecting said bolts to the lower ends of said legs, said means positioned above the lower ends of said legs.

5. Derrick structure for oil, gas and artesian wells comprising leg members, anchoring means connected to the lower end of each of said leg members, braces secured to said leg members, a base supporting structure comprising base plates, bolts extending upwardly through said base plates and adapted to engage said anchoring means to anchor said leg members to said base plates, said base plates being loose relative to said bolts, and base sills connected to said leg members, said base sills being removable without dismantling the derrick structure.

6. Derrick structure for oil, gas and artesian wells comprising leg members formed in sections, means for connecting said sections, base sills connected to said leg members, base plates carrying said leg members, bolts extending upwardly through said base plates, means for connecting said bolts to the lower ends of said leg members, said means positioned above the lower ends of said legs, and said base sills being removable without dismantling the derrick structure.

In testimony whereof we hereby affix our signatures.

GORDON BATTELLE.
HARRY M. RUNKLE.
WILLIAM B. TOBIN.